United States Patent
Bosley et al.

[19]

[11] Patent Number: 5,827,040
[45] Date of Patent: Oct. 27, 1998

[54] HYDROSTATIC AUGMENTATION OF A COMPLIANT FOIL HYDRODYNAMIC FLUID FILM THRUST BEARING

[75] Inventors: Robert W. Bosley, Cerritos; Ronald F. Miller, Marina del Rey, both of Calif.

[73] Assignee: Capstone Turbine Corporation, Tarzana, Calif.

[21] Appl. No.: 662,250

[22] Filed: Jun. 14, 1996

[51] Int. Cl.$^6$ ..................................................... F01D 3/04
[52] U.S. Cl. ........................ 415/106; 415/107; 415/180; 417/407
[58] Field of Search ................................... 415/104, 106, 415/107, 111, 112, 113, 178, 180, 176, 229; 417/405, 406, 407, 423.12

[56] References Cited

U.S. PATENT DOCUMENTS

| | | | |
|---|---|---|---|
| 2,748,714 | 6/1956 | Henry | 415/104 |
| 3,366,427 | 1/1968 | Silver et al. | 384/103 |
| 3,487,786 | 1/1970 | Danner | 415/107 |
| 3,495,886 | 2/1970 | Roberts et al. | 308/135 |
| 4,171,928 | 10/1979 | Emerson | 415/106 |
| 4,247,155 | 1/1981 | Fortmann | 384/124 |
| 4,309,144 | 1/1982 | Eggmann et al. | 415/105 |
| 4,624,583 | 11/1986 | Saville et al. | 384/105 |
| 4,701,060 | 10/1987 | Gu | 384/106 |
| 4,786,238 | 11/1988 | Glaser et al. | 417/53 |
| 4,818,123 | 4/1989 | Gu | 384/106 |
| 4,871,267 | 10/1989 | Gu | 384/105 |
| 5,102,295 | 4/1992 | Pope | 415/104 |
| 5,209,652 | 5/1993 | Fischer et al. | 417/409 |
| 5,248,205 | 9/1993 | Gu et al. | 384/106 |
| 5,358,378 | 10/1994 | Holscher | 415/170.1 |

*Primary Examiner*—Edward K. Look
*Assistant Examiner*—Ninh H. Nguyen
*Attorney, Agent, or Firm*—Albert J. Miller

[57] ABSTRACT

A system to hydrostatically augment the thrust load capacity of a bilateral compliant foil hydrodynamic fluid film thrust bearing for a turbomachine is disclosed. A plurality of channels and fixed orifices are provided in the bearing thrust plate to deliver and regulate compressor bleed air flow to the compressor side of the bilateral compliant foil hydrodynamic fluid film thrust bearing which includes additional channels and orifices to direct the bleed air against the bearing rotor thrust disk. After impinging on the rotor thrust disk, the bleed air flow exits the thrust bearing through a plurality of variable orifices comprised of the hydrodynamic thrust bearing elements which are controlled in their flow conductance by the axial position of the rotor thrust disk. The bleed air may then pass through the adjacent journal bearing which functions as a fixed orifice. The interaction of the fixed orifices and variable orifices establishes a pressure differential across and a net force applied to the bearing rotor thrust disk that varies as a function of the axial position of the bearing rotor thrust disk. Further, the bleed air from the bearing rotor thrust disk being delivered to the compliant foil hydrodynamic fluid film journal bearing of the turbomachine serves to cool the journal bearing.

53 Claims, 8 Drawing Sheets

HYDROSTATIC AUGMENTATION OF A COMPLIANT FOIL HYDRODYNAMIC FLUID FILM THRUST BEARING

TECHNICAL FIELD

This invention relates to the general field of compliant foil hydrodynamic fluid film thrust bearings and more particularly to an improved system that utilizes hydrostatically generated forces to augment the load bearing capacity of one side of a two-sided or bilateral compliant foil hydrodynamic fluid film thrust bearing.

BACKGROUND OF THE INVENTION

Compliant foil hydrodynamic fluid film thrust bearings are currently being utilized in a wide variety of high speed rotor applications. Thrust bearings of this type generally include a two-sided or bilateral thrust disk rotating element, non-rotating compliant fluid foil members that axially enclose the rotating element, and non-rotating compliant spring foil members that axially enclose the fluid foil members. A non-rotating thrust plate element and a non-rotating housing element axially enclose and provide attachments for the non-rotating foil members. The space between the rotating element and the thrust plate element on one side of the thrust bearing and the space between the rotating element and the thrust surface of the housing element on the other side of the thrust bearing are filled with fluid (usually air) which envelops the foil members.

The rotary motion of the bilateral thrust disk rotating element applies viscous drag forces to this fluid and induces a circumferential flow of the fluid between the smooth surface of the rotating element and the fluid foil member. The space between the rotating element and the fluid foil member is subdivided into a plurality of fluid-dynamic wedge channels each with its own fluid foil pad. The hydrodynamic converging ramps of the fluid foil pads (converging relative to the fluid's circumferential flow) and the smooth surface of the rotating element form the two primary surfaces of the converging wedge channels. The diverging ramps of the fluid foil pads and the smooth surface of a rotating element form the primary surfaces of the diverging wedge channels. The fluid flowing circumferentially along a converging wedge channel experiences steadily decreasing flow area, increasing circumferential flow velocity, and increasing static fluid pressure. If the rotating element moves axially toward the nonrotating fluid foil member, the convergence angle of the wedge channel increases causing the fluid pressure rise along the channel to increase. If the rotating element moves axially away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foil members causes coulomb damping of any axial or overturning motion of the rotating element of the bearing.

Owing to preload spring forces or gravity forces, the bilateral thrust disk rotating element of the thrust bearing is typically in physical contact with the fluid foil members of the bearing at rest and at low rotational speeds. This physical contact can result in bearing wear. It is only when the rotor speed is above what is termed the lift-off/touch-down speed that the fluid dynamic forces generated in the wedge channels assure a running gap between the rotating and non-rotating elements.

At turbomachine speeds slightly above the bearing's lift-off/touch down speed, the thrust bearing load capacity increases nearly with the square of turbomachine speed. But with further increases in turbomachine speed, the load capacity of the thrust bearing becomes an ever lower exponential function of turbomachine speed. At very high speeds, the thrust load capacity may not increase at all with speed.

The net axial forces generated aerodynamically by the compressor wheel and turbine wheel of a typical turbomachine increases with the square of speed at all turbomachine speeds. Thus, typically, compliant foil hydrodynamic fluid film thrust bearings can easily support turbomachine thrust loads at low speeds but may not be able to do so at high speeds.

Many turbomachines include a turbine wheel and a compressor wheel at opposite ends of a common shaft or bearing rotor positioned with their back planes opposed. The compressor end of the bearing rotor would normally include a radially extending rotor flange or thrust disk which would extend into a recess in the compressor end of the center housing adjacent to the housing's thrust surface. As described above, a bearing thrust plate would be disposed on the opposite side of the rotating thrust disk.

When the turbomachine is operated at high speed, unequal pressures and axial forces are developed at the turbine and compressor ends of the rotor that tend to force the rotating thrust disk towards the compressor end of the turbomachine. This occurs when the compressor wheel gains speed and the pressure behind the compressor wheel increases from atmospheric pressure to a portion of the total discharge pressure from the compressor.

For example, if the turbomachine has a compressor discharge pressure on the order of 29 psig, the pressure behind the back plane of the compressor wheel would be on the order of 8 psig. If, for example, the area of the back plane was 9.5 square inches, a 76 pound axial force towards the compressor end of the turbomachine would be generated and applied to the rotor.

When this is compared to the opposing turbine back plane (delta) exhaust pressure on the order of 5 psig, with a net back plane area of 6.6 square inches, generating an axial force of 33 pounds towards the turbine end of the turbomachine, it is easy to see that the thrust load on the bearings will be biased toward the compressor end of the turbomachine.

This will result in an unequal thrust loading of the thrust bearing with the compressor side thrust bearing fluid foil pads more heavily loaded than the turbine side thrust bearing fluid foil pads. In some cases, particularly in the most advanced thrust bearings where the thrust bearing fluid foil pads are essentially unloaded at rest, that is, not preloaded by the spring foil members, the compressor side thrust bearing fluid foil pads will be the only side loaded at speed. In this instance, the turbine side thrust bearing fluid foil pads would not be loaded at speed. With unequal bilateral thrust loading, or loading of only one side of the thrust bearing, unequal bearing fluid foil pad wear, or reduced fluid foil pad life or fluid foil pad failure can result. Existing turbomachines do not include any means to compensate for this net thrust loading.

A example of the prior art is described in U.S. Pat. No. 5,209,652 issued May 11, 1993 and entitled "Compact Cryogenic Turbopump". This patent does disclose a combination of a hydrostatic bearing and a hydrodynamic bearing in one assembly. But, the hydrostatic and hydrodynamic functions are in fact deliberately isolated and there is no dynamic interaction between them as there is in the present invention. It is incapable of valving the hydrostatic fluid flow with the hydrodynamic bearing elements. Its two variable orifices that function to control the hydrostatic pressures are remote from the hydrodynamic bearing. It is limited to liquids and cannot utilize a gaseous fluid. Its specific application is a single sided thrust bearing for a cryogenic temperature turbopump.

SUMMARY OF THE INVENTION

In the present invention, the unequal loading of the opposite sides of a bilateral compliant foil hydrodynamic fluid film thrust bearing is reduced or eliminated by hydrostatically augmenting one side of the bilateral compliant foil hydrodynamic fluid film thrust bearing with bleed air from the compressor which is rotatably supported by the bilateral compliant foil hydrodynamic fluid film thrust bearing and compliant foil hydrodynamic fluid film journal bearings.

The thrust force applied to the compressor side of the bearing rotor thrust disk is supported in part by compressor bleed air that is directed to and through the compressor side of the bilateral compliant foil hydrodynamic fluid film thrust bearing and applies force directly to the bearing rotor thrust disk. The bleed air is delivered to the compressor side of the bilateral compliant foil hydrodynamic fluid film thrust bearing through a plurality of channels and fixed orifices in the thrust plate. Fixed orifices are also included in the fluid foil member of the compliant foil hydrodynamic fluid film thrust bearing to allow some of the bleed air to pass through to the bearing rotor thrust disk. The bleed air between the fluid foil member and the bearing rotor thrust disk is vented through variable orifices which are formed by the axial gaps between the fluid foil member and the bearing rotor thrust disk at the outer and inner edges of the fluid foil member. The conductances of these annular variable orifices are controlled by the axial position of the bearing rotor thrust disk. The bleed air on the spring foil side of the fluid foil member is vented through variable annular orifices formed by the total axial gaps between all spring foil elements, the fluid foil member and the bearing rotor thrust plate. The conductances of these annular variable orifices are controlled by the deflection of the spring foil member.

Once the compressor bleed air is vented through the variable orifices of the compressor side of the bilateral compliant foil hydrodynamic fluid film thrust bearing, it can bypass the turbine side bilateral compliant foil hydrodynamic fluid film thrust bearing and then it may be directed around, through or inside the compliant foil hydrodynamic fluid film journal bearing to provide cooling for the journal bearing cartridge, the foils and the journal bearing rotor. Grooves and/or channels may be provided in the compliant foil hydrodynamic fluid film journal bearing cartridge and/or journal bearing rotor to facilitate the flow of cooling air across these surfaces. The bleed air passages in the compliant foil hydrodynamic fluid film journal bearing and journal bearing rotor function as fixed orifices. The interaction of the variable orifices, and the fixed orifices upstream and downstream from the variable orifices, control the differential pressure across, and the force applied to, the bearing rotor thrust disk, thus establishing a hydrostatic thrust bearing function. The variable and fixed orifices also control the pressure across and the force applied to the fluid foil pads thus establishing an air spring function.

It is, therefore, a principal object of the present invention to provide hydrostatic thrust load capacity augmentation for one side of a bilateral compliant foil hydrodynamic fluid film thrust bearing which supports a rotary machine having a compressor wheel.

It is another object of the present invention to provide hydrostatic thrust load capacity augmentation for a compliant foil hydrodynamic fluid film thrust bearing utilized in a turbogenerator which has a compressor wheel, a turbine wheel, a motor/generator and is radially supported by compliant foil hydrodynamic fluid film journal bearings.

It is another object of the present invention to increase the load that can be applied to the thrust bearing at any turbomachine speed without damaging the bearing.

It is another object of the present invention to generate hydrostatic thrust bearing forces that are in the same axial direction as the hydrodynamic thrust bearing forces.

It is another object of the present invention to assure that the axial rotor position that the hydrostatic thrust bearing function tries to achieve is the same as the axial rotor position that the hydrodynamic thrust bearing function tries to achieve.

It is another object of the present invention to produce hydrostatically generated thrust forces that are proportional to the square of the turbomachine speed.

It is another object of the present invention to produce hydrostatically generated thrust forces that vary with the axial position of the shaft so as to force the shaft to move axially to the desired position.

It is another object of the present invention to produce an air spring function to support the bearing fluid foil pads.

It is another object of the present invention to produce air pressure support for the fluid foil pads that will force the fluid foil pads into a convex aerodynamic shape on the side facing the bearing rotor thrust disk.

It is another object of the present invention to utilize compressor bleed air to apply a differential pressure across the rotating thrust disk and thus generate hydrostatic thrust bearing forces.

It is another object of the present invention to take advantage of the fact that the compressor discharge gauge pressure varies with the square of turbomachine speed to assure that the hydrostatically generated thrust forces are also proportional to the square of turbomachine speed.

It is another object of the present invention to modulate the compressor bleed air flow used to generate the differential pressure across the rotating thrust disk and thus generate hydrostatic thrust bearing forces that are a function of the axial position of the shaft.

It is another object of the present invention to utilize the relative motions of the hydrodynamic thrust bearing members and elements to provide variable orifice flow control of the bleed air used to generate hydrostatic thrust bearing forces; thus assuring that the hydrostatic thrust bearing functions and the hydrodynamic thrust bearing functions work together rather than against each other.

It is another object of the present invention to utilize the air flow passages in the compliant foil hydrodynamic fluid film journal bearing adjacent to the thrust bearing as fixed orifices in series with other fixed orifices and the variable orifices of the compliant foil hydrodynamic fluid thrust bearing to jointly control the differential pressure across the rotating thrust disk and the resulting hydrostatic thrust bearing force.

It is another object of the present invention to utilize the compressor bleed air (after its use by the hydrostatic thrust bearing function) to cool the adjacent journal bearing and bearing rotor.

It is another object of the present invention to utilize bleed air passages through the journal bearing, including flow around and adjacent to the journal bearing foils to facilitate foil cooling and to function as fixed orifice(s) for the hydrostatic augmentation function.

It is another object of the present invention to utilize bleed air passages around the journal bearing cartridge to facilitate its cooling and function as fixed orifices for the hydrostatic augmentation function.

It is another object of the present invention to utilize bleed air passages within the journal bearing rotor to facilitate its cooling and function as fixed orifices for the hydrostatic augmentation function.

It is another object of the present invention when journal bearing cooling is desired to utilize compressor bleed air tapped off the compressor flow path before the diffuser in preference to after the diffuser since less energy is required to compress this air and because it is cooler (making a better cooling media).

It is another object of the present invention to minimize the bleed air flow required to generate the thrust augmentation forces.

It is another object of the present invention to reduce the risk of bearing failure by reducing the thrust loads that must be supported by the hydrodynamic thrust bearing elements.

It is another object of the present invention to reduce bearing drag torque by reducing the thrust loads that must be supported by the hydrodynamic thrust bearing elements.

It is another object of the present invention to reduce bearing power consumption by reducing the thrust loads that must be supported by the hydrodynamic thrust bearing elements.

It is another object of the present invention to reduce bearing heating by reducing the thrust loads that must be supported by the hydrodynamic thrust bearing elements.

BRIEF DESCRIPTION OF THE DRAWINGS

Having thus described the present invention in general terms, reference will now be made to the accompanying drawings in which:

DETAILED DESCRIPTION OF THE PREFERRED EMBODIMENTS

Figure 1:
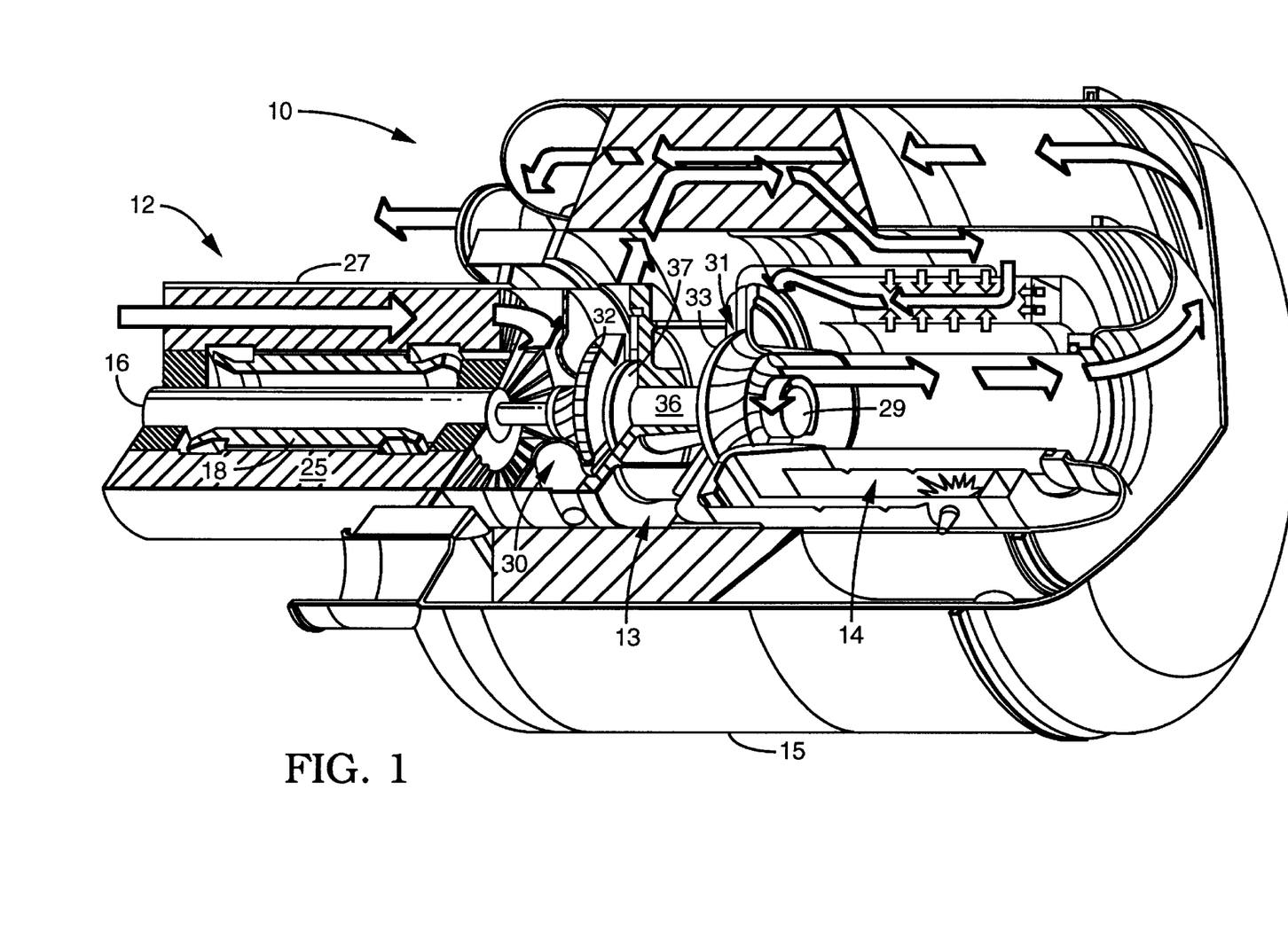
FIG. 1 is a perspective view, partially cut away, of a turbogenerator utilizing the hydrostatic augmentation system of the present invention with a bilateral compliant foil hydrodynamic fluid film thrust bearing.

A permanent magnet turbogenerator 10 is illustrated in FIG. 1 as an example of a turbogenerator utilizing the hydrostatic augmentation system for a compliant foil hydrodynamic fluid film thrust bearing of the present invention. The permanent magnet turbogenerator 10 generally comprises a permanent magnet generator 12, a power head 13, a combustor 14 and a recuperator (or heat exchanger ) 15.

The permanent magnet generator 12 includes a permanent magnet rotor or sleeve 16, having a permanent magnet disposed therein, rotatably supported within a permanent magnet stator 18 by a pair of spaced journal bearings. Radial permanent magnet stator cooling fins 25 are enclosed in an outer cylindrical sleeve 27 to form an annular air flow passage which cools the permanent magnet stator 18 and thereby preheats the air passing through on its way to the power head 13.

The power head 13 of the permanent magnet turbogenerator 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing 38 within the center bearing housing 39 while the bearing rotor thrust disk 37 at the compressor end of the bearing rotor 36 is rotatably supported by a bilateral thrust bearing. The bearing rotor thrust disk 37 is adjacent the thrust face 46 at the compressor end of the center bearing housing 39 while a bearing thrust plate 42 is disposed on the opposite side of the bearing rotor thrust disk 37 relative to the center housing thrust face 46.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine 31. The expanded turbine exhaust gases are then passed through the recuperator 15 before being discharged from the turbogenerator 10.

Figure 2:
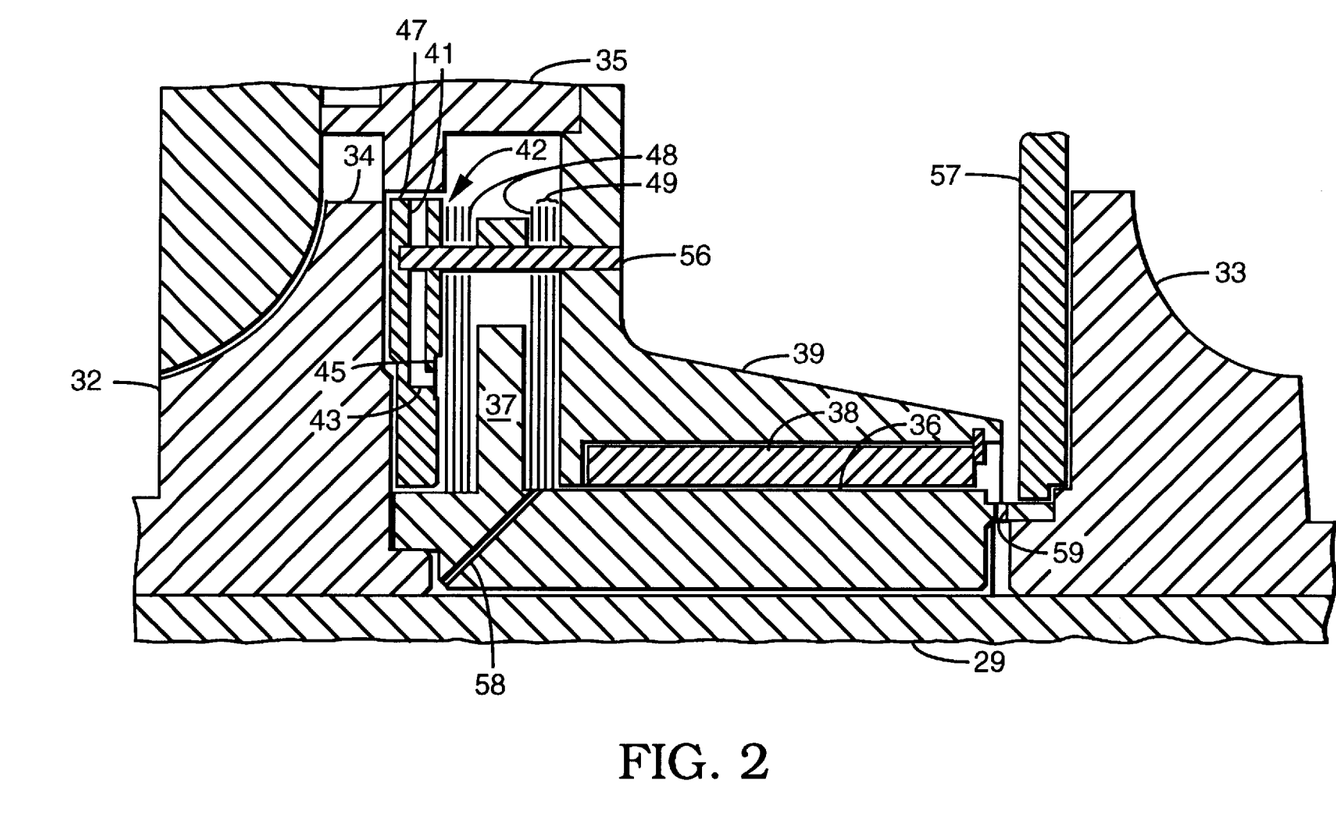
FIG. 2 is an enlarged sectional view of a portion of the turbogenerator of FIG. 1 illustrating the power head and including hydrostatic augmentation of the bilateral compliant foil hydrodynamic fluid film thrust bearing.
Figure 3:
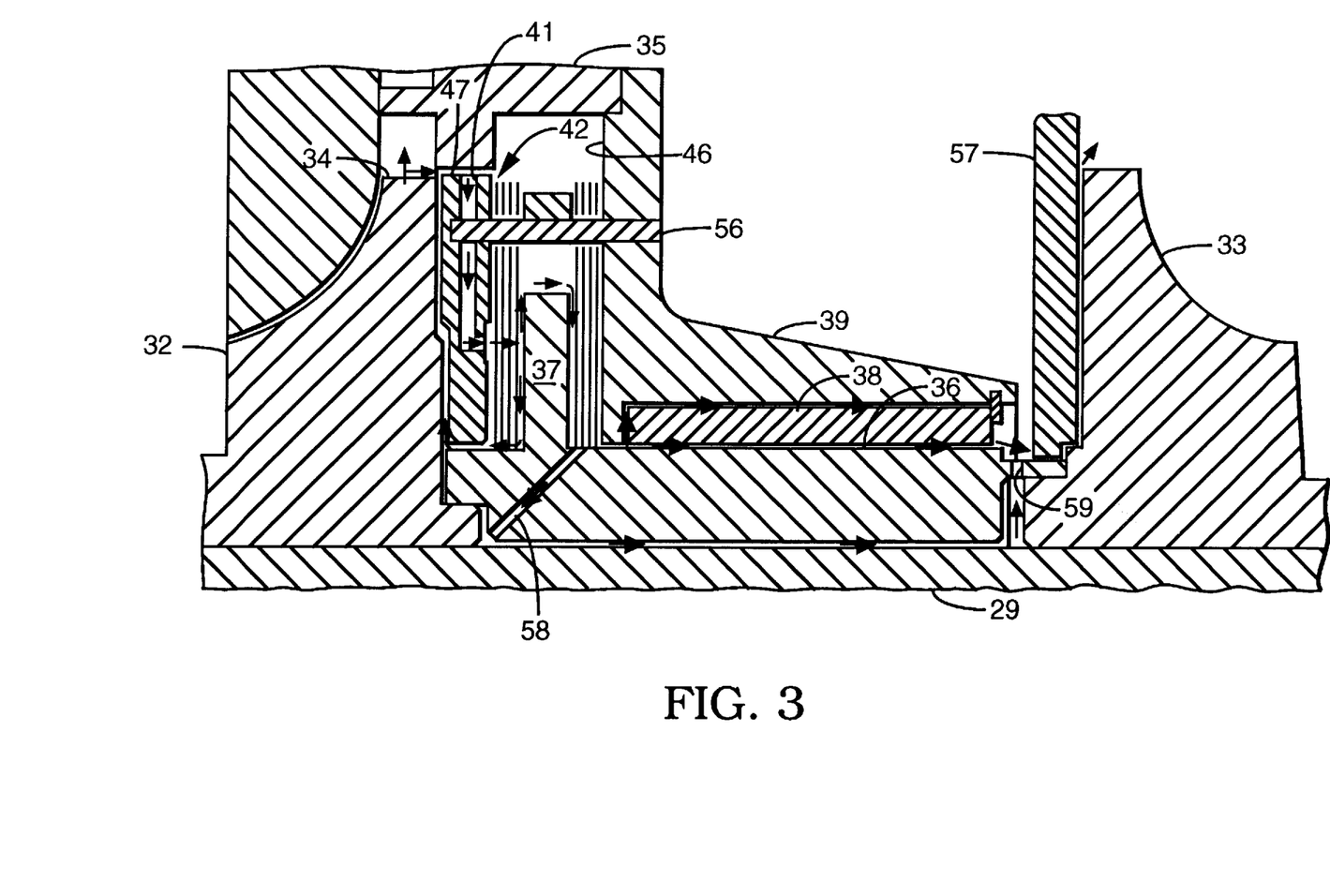
FIG. 3 is the same view as FIG. 2 but also includes arrows to indicate the flow of bleed air from the compressor to hydrostatically augment the bilateral compliant foil hydrodynamic fluid film thrust bearing.

As illustrated in FIG. 2 (and FIG. 3 which includes arrows indicating the flow of the bleed air from the compressor)

compressed air at approximately nineteen (19) psig is bled from near the tip 34 of the compressor impeller 32 through a gap between the compressor diffuser plate 35 and the outer periphery 47 of the thrust plate 42 through a plurality of radially extending orifices 41 in the thrust plate 42 to a plurality of axially extending feeder holes 43. The dead airspace between the compressor diffuser plate 35 and the center bearing housing 39 forces the bleed air to move into the radially extending orifices 41.

The feeder holes 43 supply bleed air to a pattern of channels 45 in the thrust face 44 of the thrust plate 42 adjacent to the compressor side of the compliant foil hydrodynamic fluid film thrust bearing. The bleed air passes through the cavities and/or slots in the spring foil elements and then through the fixed orifice holes in the fluid foil member to impinge upon the compressor side face of the bearing rotor thrust disk 37 to force the rotor assembly axially in the opposite direction (towards the turbine 31). The air then bleeds out of the compressor side of the compliant foil hydrodynamic fluid film thrust bearing which has been caused to function as a variable orifice by virtue of the and around the bearing r then flows outward over and around the bearing rotor thrust disk 37, around the turbine side of the compliant foil hydrodynamic fluid film thrust bearing, and exits the thrust bearing area by flowing through the compliant foil journal bearing cartridge, and over and through the cartridge's external and internal cooling passages and through the bearing rotor. After cooling the journal bearing 38, the air then exits the turbogenerator 10 in the exhaust gas stream as shown by the arrows in FIG. 3. In addition, some bleed air is vented radially inward (recirculated) through the space between the thrust plate 42 and bearing rotor thrust disk 37, this space functioning as a variable orifice, and radially outward through the space between the thrust plate 42 and the back of the compressor wheel 32.

The thrust bearing fluid foil member 48 and thrust bearing spring foil member 49, including three (3) spring foil elements 60, 61, and 62, are disposed on either side of the bearing rotor thrust disk 37. On the turbine side, the fluid foil member 48 and spring foil member 49 are positioned on the thrust face 46 of the center bearing housing 39 and on the compressor side they are adjacent to the thrust plate 42. It should be recognized that the space between the thrust bearing plate 42 and the bearing rotor thrust disk 37 and the space between the bearing rotor thrust disk 37 and the thrust face 46 of the center bearing housing 39 is shown as enlarged for purposes of illustration.

A cooling air passage 58 may extend from the base of the turbine side of the bearing rotor thrust disk 37 to the compressor end of the bore in the bearing rotor 36. In addition, a cooling air vent 59 may be included in the turbine end thinned down section of the bearing rotor 36 to allow the flow of cooling air to traverse the bearing rotor 36 and exit adjacent to the heat shield 57.

The thrust bearings would be of the compliant foil hydrodynamic fluid film type of bearing, an example of which can be found in U.S. Pat. application Ser. No. 08/363,540 filed Dec. 23, 1994 by Robert W. Bosley, entitled "Compliant Foil Hydrodynamic Fluid Film Thrust Bearing" (issuing as U.S. Pat. No. 5,529,398 on Jun. 25, 1996) and is herein incorporated by reference. Likewise, the journal bearings should be of the compliant foil hydrodynamic fluid film type of bearing. An example of this type of bearing is described in detail in U.S. Pat. No. 5,427,455 issued Jun. 27, 1995, to Robert W. Bosley, entitled "Compliant Foil Hydrodynamic Fluid Film Radial Bearing" and is also herein incorporated by reference.

Figure 4:
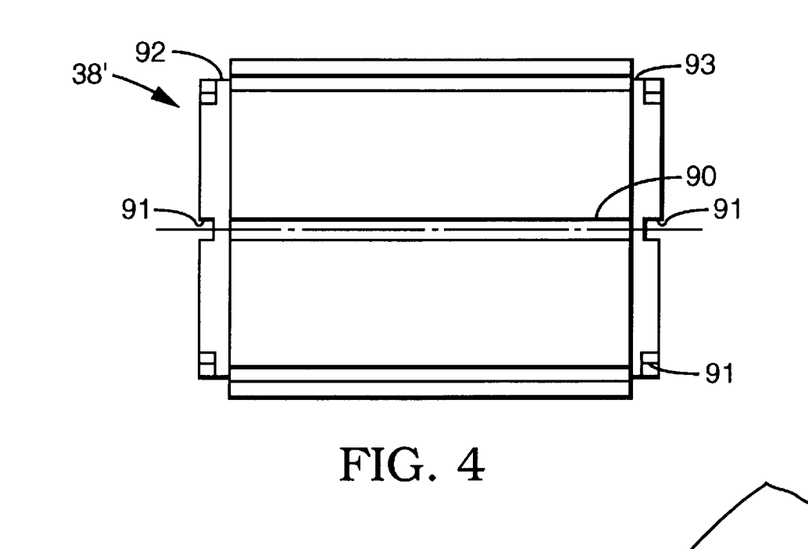
FIG. 4 is a plan view of an alternate journal bearing cartridge for the turbogenerator of FIGS. 1–3.
Figure 5:
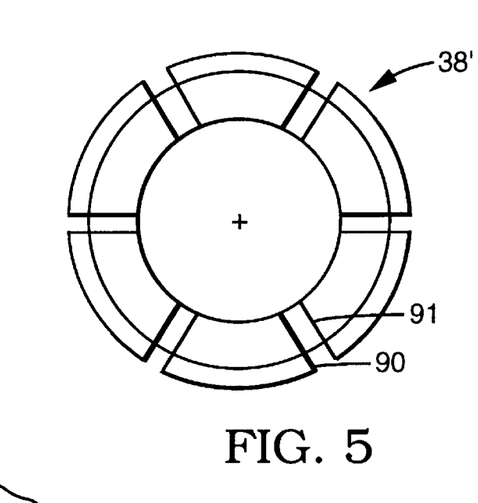
FIG. 5 is a end view of the alternate journal bearing cartridge of FIG. 4.

FIGS. 4 and 5 illustrate an alternate journal bearing cartridge 38' in which there are a plurality (shown as six) peripheral slots 90 extending the entire length of the journal bearing cartridge 38'. A like plurality of radial end slots 91 connect the peripheral slots 90 with the interior of the journal bearing cartridge 38'. Each end of the cartridge 38' is cut back to form smaller diameter ends 92 and 93. The slots 90 and 91 and smaller diameter ends 92 and 93 together facilitate the flow of compressor air from the compliant foil hydrodynamic fluid film thrust bearing around the journal bearing cartridge 38' and provide substantial cooling of the bearing cartridge 38' and bearing rotor 36. The slots 90 and 91 can also function as fixed orifices to control the hydrostatic augmentation of the thrust bearing.

Figure 6:
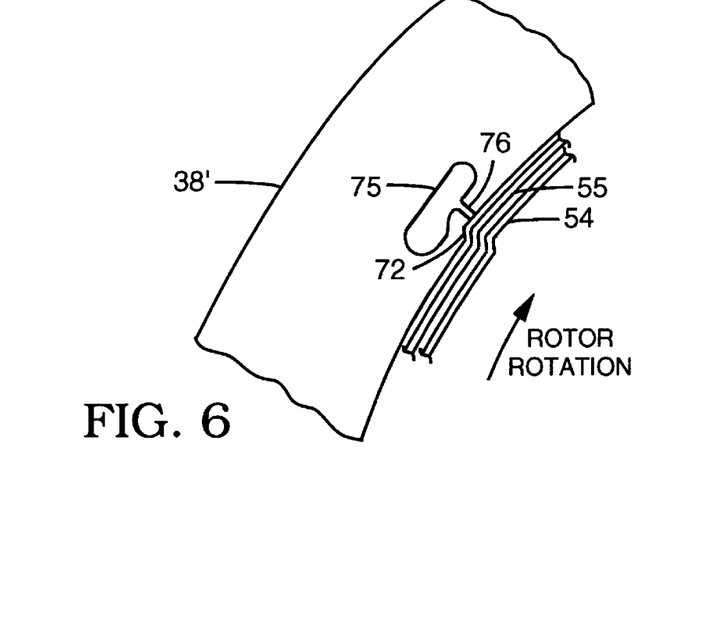
FIG. 6 is an exploded end view of a portion of the journal bearing cartridge of FIGS. 4 and 5.

An exploded end view of a portion of the cartridge 38' is shown in FIG. 6. The fluid foil member 54 and spring foil member 55 are shown in the bore of the cartridge 38' near a diverging ramp 72. An enlarged generally arcuate cavity 75 communicates with the bore of the cartridge 38' by means of a radial slot 76 near the base of the diverging ramp 72. The arcuate cavity may be larger towards the diverging ramp 72 since that will normally be the hottest area of the bore.

An arcuate cavity 75 may be located at each intersection of the base of a diverging ramp 72 and the beginning of the next converging ramp, but not at the preload bar where there is already greater clearances for cooling air flow. These arcuate cavities 75 can be produced with a small EDM entry slot which is then enlarged beyond the slot width. Although the area at the base of the diverging ramps 72 would be the preferred location for the slot 76 and cavity 75, they can also be situated at other locations around the bore. A bore liner might, however, be required at other locations to prevent the cantilever beam from getting into a slot 76.

Figure 7A:
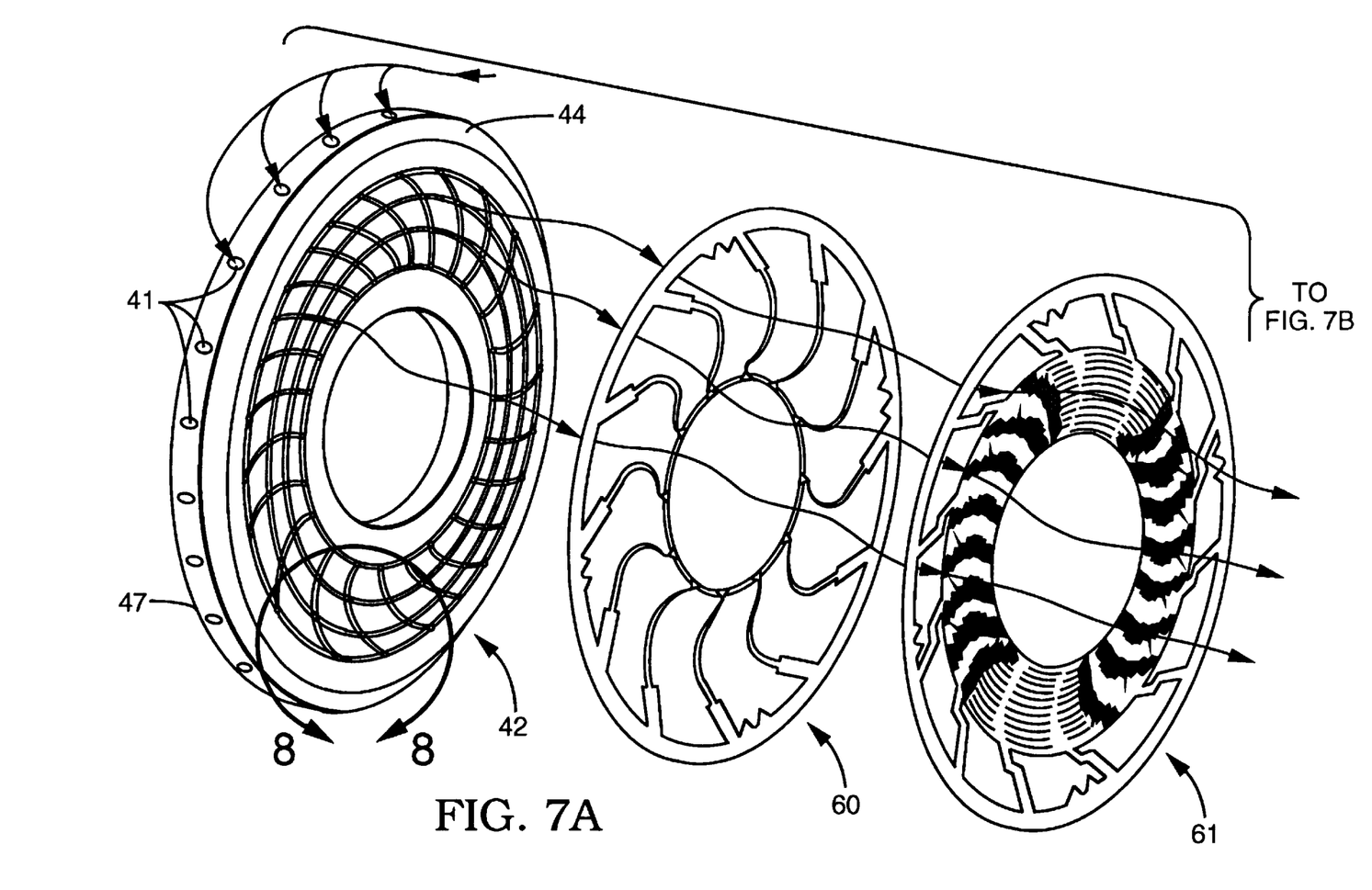
FIG. 7 is an exploded perspective view of the thrust plate, spring foil member, fluid foil member and bearing rotor thrust disk of the compressor side of the bilateral compliant foil hydrodynamic fluid film thrust bearing illustrating the flow of the hydrostatic augmentation air therethrough.
Figure 7B:
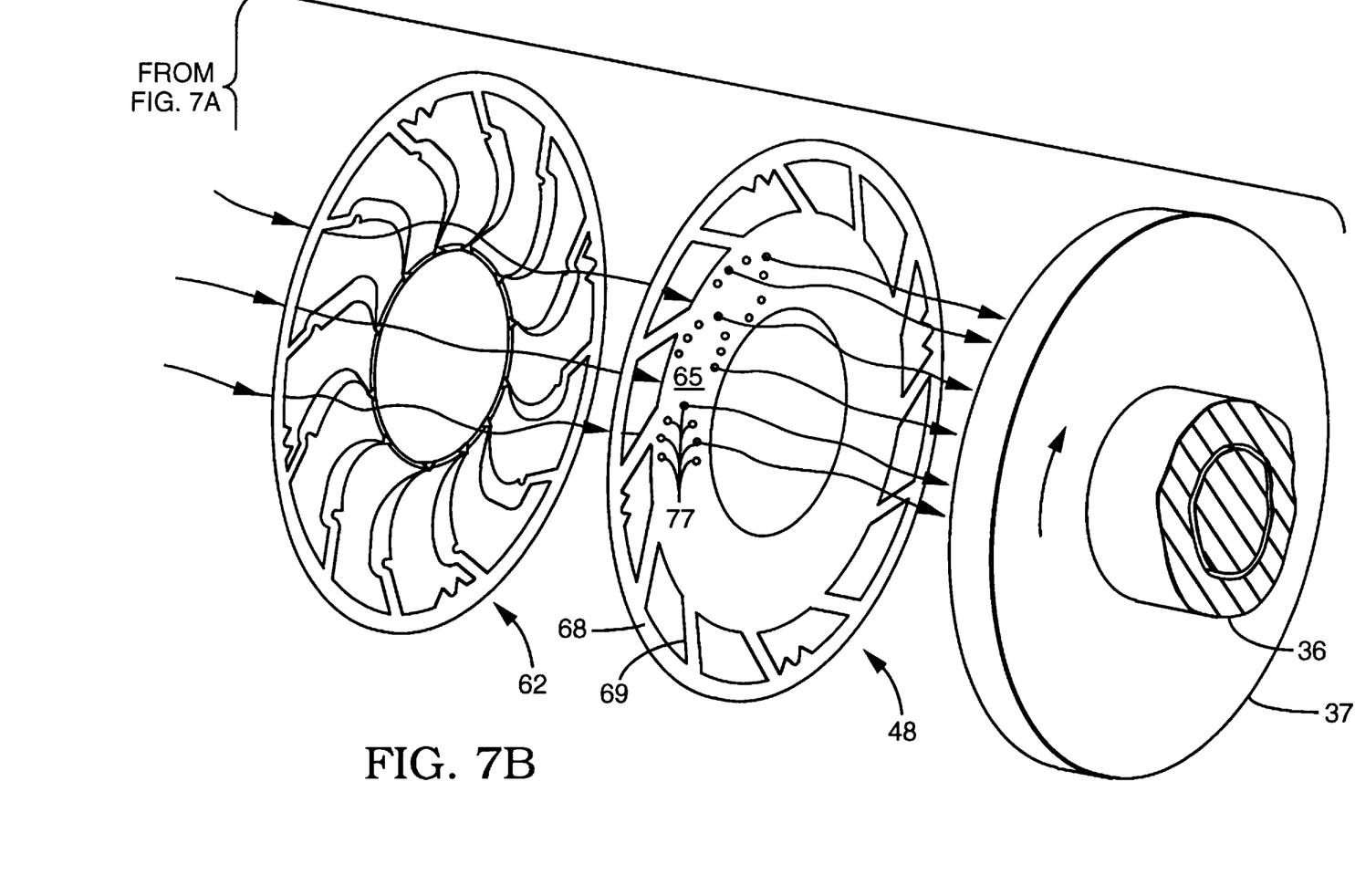

The thrust face 44 of the thrust plate 42 is shown in detail in the exploded perspective of FIG. 7. The plurality of radially extending orifices 41 are shown spaced around the periphery 47 of the thrust plate 42.

Figure 8:
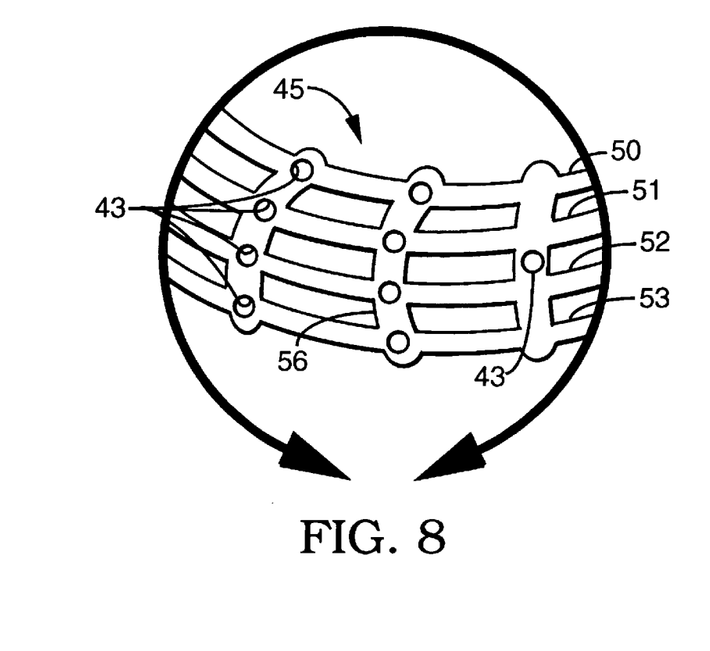
FIG. 8 is an enlarged partial view of circle 8 of FIG. 7 illustrating the flow passages in the thrust plate in greater detail.

As best illustrated in FIG. 8, the channels 45 in the thrust face 44 of the thrust plate 42 consist of four (4) circumferential channels or rings 50, 51, 52, & 53 interconnected by a plurality of generally radially extending arcuate channels 56. The feeder holes 43 provide bleed air from the radially extending orifices 41 to the arcuate channels 56. Each arcuate channel 56 may be supplied by a single feeder hole 43 or there may be a plurality of feeder holes for each arcuate channel 56. In FIG. 8, some arcuate channels 56 are shown as being fed by a single feeder hole 43 while other arcuate channels are shown as being fed by four (4) feeder holes 43, one for each circumferential channel 50, 51, 52, & 53. The number of feeder holes 43 can be selected based upon bleed air flow and distribution requirements.

The bleed air distributed by the channels 45 in the thrust face 44 of the thrust plate 42 flows through the thrust bearing spring foil member 49 which consists of outer support foil 60, spring foil element 61, and inner support foil 62 before acting upon the fluid foil member 48.

Figure 9:
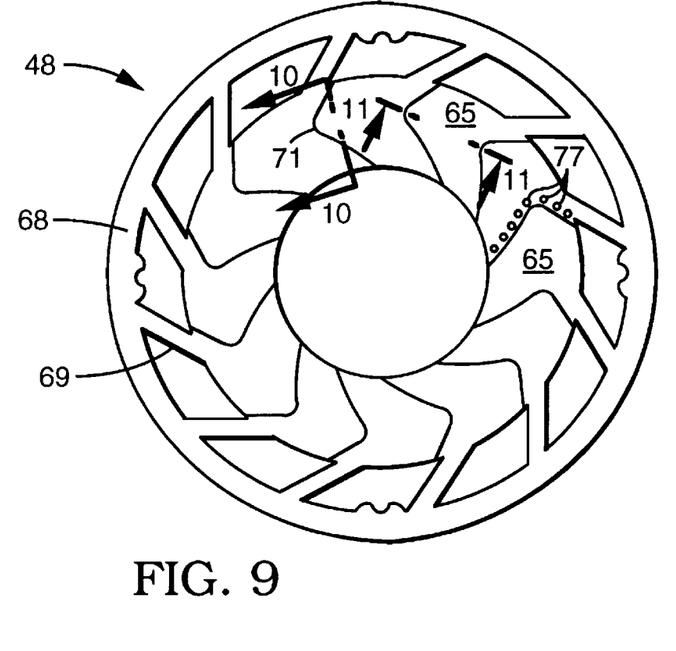
FIG. 9 is a plan view of a fluid foil member of the compliant foil hydrodynamic fluid film thrust bearing.

The fluid foil member 48, best illustrated in FIG. 9, is integrally formed from a flat sheet of a nickel steel such as Inconel 750X by room temperature pressing steeply sloped joggles to function as diverging wedge channels or ramps while allowing the hydrodynamic gradually converging wedge channel ramps to result without plastic deformation as the straight line connection between the joggles. The fluid foil member 48 would normally be annealed both during forming and use and may be coated prior to forming the joggles with any number of a myriad of low friction or friction reducing coating materials which can protect the metal from abrasion during starting and stopping, and inadvertent and occasional high speed touch-downs. The coating would also provide for some imbedment of contamination particles.

Figure 10:
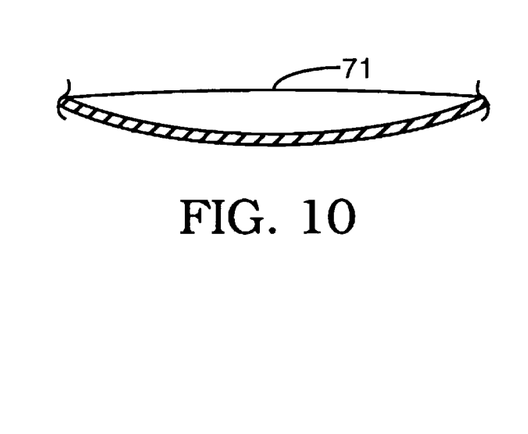
FIG. 10 is an enlarged sectional view of the fluid foil member of FIG. 9 taken along line 10—10.
Figure 11:
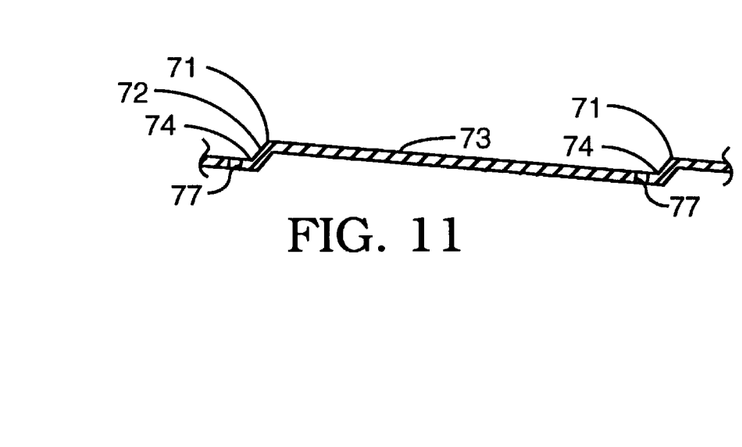
FIG. 11 is an enlarged sectional view of the fluid foil member of FIG. 9 taken along line 11—11.

The fluid foil member 48 includes a plurality of individual fluid foil pads 65 which are generally chevron shaped and connected to an outer self shimming ring 68 by support webs 69. Each fluid foil pad 65 has a trailing edge 71 with a rounded trailing point and a leading edge 74. A generally scoop shaped hydrodynamic converging ramp 73 is formed with a generally straight ramped contour from the leading edge 74 to the trailing edge 71 and a rounded concave contour from the circumferential line of the trailing edge 71 to the outer diameter of the fluid foil pad 65 and to the inner diameter of the fluid foil pad 65. As best illustrated in the two sectional views of FIGS. 10 and 11, the generally scooped shaped hydrodynamic converging ramps are separated by diverging ramps 72.

On the compressor side of the bilateral compliant foil hydrodynamic fluid film thrust bearing, a plurality of air flow orifices 77 are arranged at the base or beginning of each of the hydrodynamic converging ramps 73 of the fluid foil pads 65. The air flow orifices 77 allow the bleed air that has passed through the spring foil members 49 to pass through the fluid foil member 48 to apply a force against the compressor side face of the bearing rotor thrust disk 37 and establish a hydrostatic bearing function. The pressure drop across air flow orifices 77 establishes an air spring function supporting the fluid foil pads 65 of the fluid foil member 48. Both the hydrostatic bearing function and the hydrostatic spring function drive the bearing rotor thrust disk 37 towards the turbine. When the bearing rotor thrust disk 37 moves towards the turbine, more air bleeds outward and over the bearing rotor thrust disk 37 and around the turbine side thrust bearing and more air bleeds inward and between the compressor wheel back plane and thrust plate 42 causing the force exerted on the thrust disk surface to be somewhat diminished. The initial axial thrust from the hydrostatic bearing function (and the hydrostatic spring function) will be reduced until it nearly matches and opposes the net thrust of the compressor and turbine wheels. The turbine side of the compliant foil hydrodynamic fluid film thrust bearing will be conventional without the air flow orifices in the fluid foil pads.

Bleed air flowing through the spring foil members 49 and the fluid foil member 48 on the compressor side of the bearing rotor thrust disk 37 causes the fluid foil member 48 to deflect towards the bearing rotor thrust disk 37 and causes the bearing rotor thrust disk 37 to move towards the turbine 31. Movement of the bearing rotor thrust disk 37 towards the thrust plate 42 and the compressor 30 will serve to increase the hydrostatic forces on the compressor side of the bearing rotor thrust disk 37 by narrowing the flow vent path for the bleed air out of the thrust bearing.

Since the compressor discharge pressure varies with the square of turbomachine speed, the hydrostatically generated thrust forces will also be proportional to the square of turbomachine speed. Also, the hydrostatically generated thrust forces will be a function of the axial position of the bearing rotor thrust disk 37. The flow of bleed air through the compliant foil hydrodynamic fluid film thrust bearing will be affected by the axial position of the bearing rotor thrust disk 37 and this relative position will serve as a variable orifice flow control of the bleed air used to attenuate the hydrostatically generated thrust forces. The hydrostatic and hydrodynamic thrust bearing forces cooperate and function integrally together. The fixed orifices of the compliant foil hydrodynamic fluid film journal bearing will work in series with the variable orifices of the compliant foil hydrodynamic fluid film thrust bearing to jointly control the differential pressure across the rotating bearing thrust disk and the resulting hydrostatic thrust bearing force.

Figure 12:
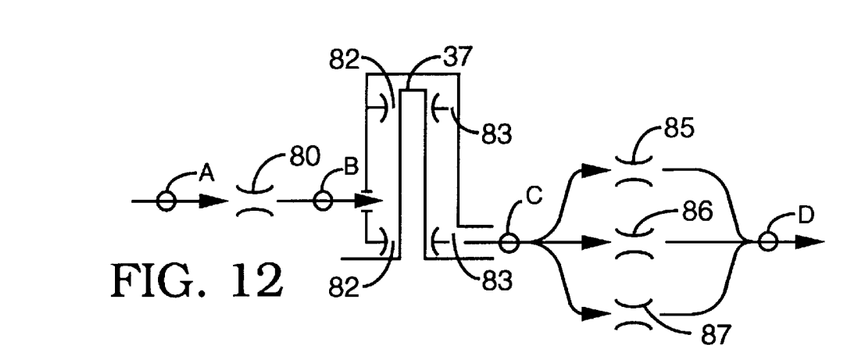
FIG. 12 is a schematic illustration of the fluid flow through the hydrostatic augmentation servocontrol features of the bilateral compliant foil hydrodynamic fluid film thrust bearing.

FIG. 12 is a schematic illustration of the fluid servocontrol for the hydrostatic augmentation air flow through the bilateral compliant foil hydrodynamic fluid film thrust bearing. The left arrow identified as A represents compressor wheel static pressure discharge before the compressor diffuser. This pressure would be on the order of nineteen (19) to twenty-four (24) psig. The fixed orifice 80 represents the radially extending orifices 41, the axially extending feeder holes 43, and channels 45, all in the thrust plate 42 together with air flow orifices 77 in the fluid foil pad 65. Pressure arrow B, on the order of sixteen (16) psig is directed to the thrust disk 37 and to the thrust bearing variable orifices 82 and then to the bypass passages 83 around the turbine side thrust bearing before reaching pressure arrow C, which is on the order of eight (8) psig.

Since the bearing rotor thrust disk will be moved axially by the net aerodynamic and hydrostatic thrust forces acting thereon, the orifices 82 are indeed variable. When the bearing rotor thrust disk is moved to the left by these net thrust forces, the hydrostatic pressure on the left or compressor side of the bearing rotor thrust disk 37 will be increased, thus effectively balancing the net thrust forces. The variable orifices 82, interacting with the fixed orifices, effectively control the level of balancing hydrostatic thrust forces that are generated. The differential pressure across the rotating bearing rotor thrust disk 37, and thus the hydrostatic thrust forces, are a function of the axial position of the bearing rotor thrust disk 37. The variable orifices 82 represent the distance between the thrust bearing fluid foil member 48 and the bearing rotor thrust disk 37.

The bleed air then proceeds around and through the compliant foil hydrodynamic fluid film journal bearing represented by fixed orifices 85, 86, and 87 before reaching a pressure on the order of four (4) psig at arrow D. In addition to the variable orifices 82, the downstream fixed orifices 85, 86, and 87 will also impact the differential pressure across the rotating bearing rotor thrust disk 37 and will function in concert with the variable orifices 82. Fixed orifice 85 represents the flow of cooling air between the bearing cartridge 38' and the center bearing housing 39, fixed orifice 86 represents the flow of cooling air through the bearing cartridge 38', including slots 90 and 91 and arcuate cavities 75, and fixed orifice 87 represents the flow of cooling air between the bearing rotor 36 and the tie bar 29. As best shown in FIG. 3, the air then flows past the turbine wheel back face before it is mixed with the turbine exhaust gases to be discharged to atmosphere with the recuperator discharge. The pressures stated above would be typical for full speed operation of the turbomachine and would obviously be less for partial speed operation.

Figure 13:
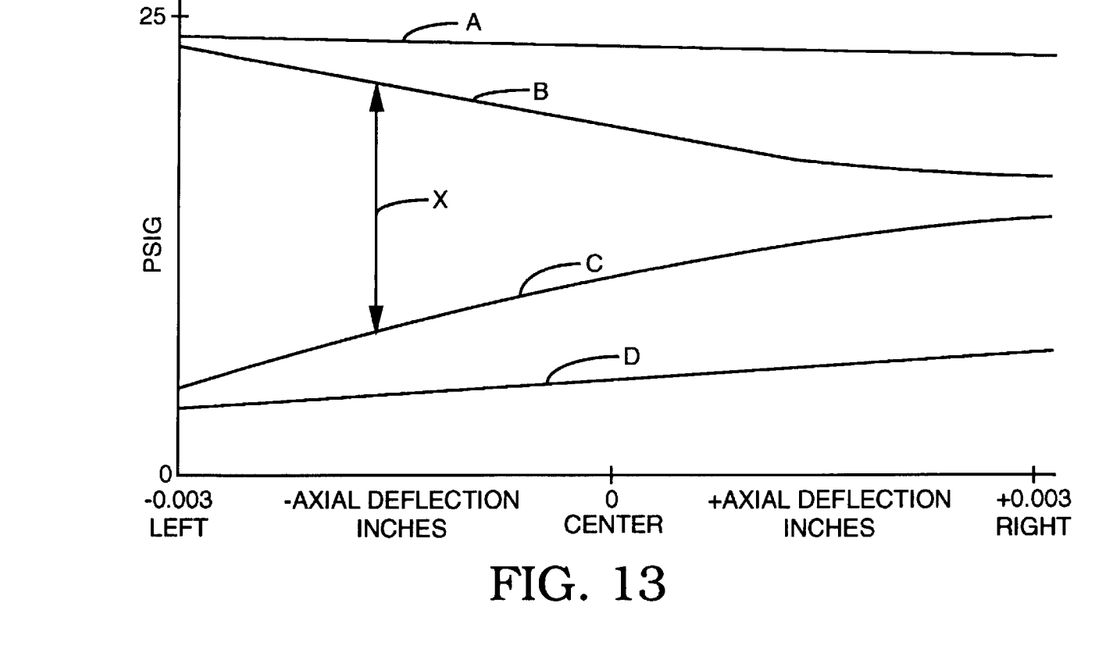
FIG. 13 is a graph illustrating the pressure in pounds per square inch (psig) at various points in the servocontrol vs. axial deflection in inches of the thrust disk from its center position.

Pressure in pounds per square inches (psig) is plotted against axial deflection of the bearing rotor thrust disk 37 from center location in inches in FIG. 13 for each of the pressure arrows or points of FIG. 12. Line A represents the pressure at point A, line B represents the pressure at point B, line C represents the pressure at point C, and line D represents the pressure at point D. The distance between lines B and C represents the pressure differential across the bearing rotor thrust disk 37.

While specific embodiments of the invention have been illustrated and described, it is to be understood that these are provided by way of example only and that the invention is not to be construed as being limited thereto but only by the proper scope of the following claims.

What we claim is:

1. A hydrostatic augmentation system for a bilateral compliant foil hydrodynamic fluid film thrust bearing used in a turbomachine, said turbomachine having a compressor and a turbine on a common bearing rotor rotatably supported by a compliant foil hydrodynamic fluid film journal bearing and a bilateral compliant foil hydrodynamic fluid film thrust bearing acting upon a bearing rotor thrust disk, said hydrostatic augmentation system comprising:

means to deliver bleed air from said compressor to the compressor side of said bilateral compliant foil hydrodynamic fluid film thrust bearing, said bearing having a fluid foil member and a spring foil member; and orifice means in said fluid foil member of said compressor side bilateral compliant foil hydrodynamic fluid film thrust bearing to deliver bleed air against the bearing rotor thrust disk to augment the thrust force applied by the hydrodynamic thrust bearing to the compressor side of said bearing rotor thrust disk.

2. The hydrostatic augmentation system of claim 1 wherein said bilateral compliant foil hydrodynamic fluid film thrust bearing includes a thrust plate on the compressor side thereof, and said means to deliver bleed air to the compressor side of said bilateral compliant foil hydrodynamic fluid film thrust bearing including a plurality of connected radially and axially extending orifices in said thrust plate.

3. The hydrostatic augmentation system of claim 1 wherein said bilateral compliant foil hydrodynamic fluid film thrust bearing includes a thrust plate on the compressor side thereof, and said means to deliver bleed air to the compressor side of said bilateral compliant foil hydrodynamic fluid film thrust bearing includes a first plurality of open channels on the bearing rotor thrust disk side of said thrust plate.

4. The hydrostatic augmentation system of claim 3 wherein said first plurality of open channels are circumferential.

5. The hydrostatic augmentation system of claim 4 wherein said means to deliver bleed air to the compressor side of said bilateral compliant foil hydrodynamic fluid film thrust bearing includes a second plurality of open channels on the thrust disk side of said thrust plate to interconnect said first plurality of circumferential channels.

6. The hydrostatic augmentation system of claim 5 wherein said second plurality of open channels to interconnect said first plurality of circumferential channels are arcuate.

7. The hydrostatic augmentation system of claim 1 wherein said bilateral compliant foil hydrodynamic fluid film thrust bearing includes a thrust plate on the compressor side thereof, and said means to deliver bleed air to the compressor side of said bilateral compliant foil hydrodynamic fluid film thrust bearing includes a plurality of enlarged recesses on the bearing rotor thrust disk side of said thrust plate.

8. The hydrostatic augmentation system of claim 1 wherein said fluid foil member of said compressor side bilateral compliant foil hydrodynamic fluid film thrust bearing includes a plurality of fluid foil pads each having a hydrodynamic converging ramp, and said orifice means includes a plurality of openings at the base of each hydrodynamic converging ramp.

9. The hydrostatic augmentation system of claim 8 wherein said hydrostatic augmentation system establishes an air spring function to support said fluid foil pads.

10. The hydrostatic augmentation system of claim 8 wherein said hydrostatic augmentation system produces air pressure support for said fluid foil pads to force said fluid foil pads into a convex aerodynamic shape on the side facing said bearing rotor thrust disk.

11. The hydrostatic augmentation system of claim 1 wherein said bilateral compliant foil hydrodynamic fluid film thrust bearing includes a thrust plate on the compressor side thereof, and said means to deliver bleed air to the compressor side of said bilateral compliant foil hydrodynamic fluid film thrust bearing includes a plurality of connected radially and axially extending orifices in said thrust plate and a plurality of connected circumferential and arcuate channels on the thrust disk side of said thrust plate.

12. The hydrostatic augmentation system of claim 11 wherein said fluid foil member of said compressor side bilateral compliant foil hydrodynamic fluid film thrust bearing includes a plurality of fluid foil pads each having a hydrodynamic converging ramp, and said orifice means includes a plurality of openings at the base of each hydrodynamic converging ramp.

13. The hydrostatic augmentation system of claim 1 wherein a pressure differential is created across said bearing rotor thrust disk.

14. The hydrostatic augmentation system of claim 13 wherein the pressure differential created across said bearing rotor thrust disk varies.

15. The hydrostatic augmentation system of claim 13 wherein said pressure differential across said bearing rotor thrust disk generates hydrostatic thrust bearing forces on one side of said bearing rotor thrust disk.

16. The hydrostatic augmentation system of claim 15 wherein said pressure differential across said bearing rotor thrust disk generates hydrostatic thrust bearing forces on one side of said bearing rotor thrust disk in the same direction as the hydrodynamic forces generated by said bearing.

17. The hydrostatic augmentation system of claim 15 wherein said pressure differential across said bearing rotor thrust disk attempts to achieve the same rotor position as the hydrodynamic forces generated by said bearing.

18. The hydrostatic augmentation system of claim 15 wherein the hydrostatic thrust bearing forces generated on one side of said bearing rotor thrust disk are a function of the axial position of said bearing rotor thrust disk.

19. The hydrostatic augmentation system of claim 15 wherein the hydrostatic thrust bearing forces generated on one side of said bearing rotor thrust disk are proportional to the square of turbomachine speed.

20. The hydrostatic augmentation system of claim 1 and in addition means to deliver bleed air from said bearing rotor thrust disk to the compliant foil hydrodynamic fluid film journal bearing to cool the compliant foil hydrodynamic fluid film journal bearing.

21. The hydrostatic augmentation system of claim 20 wherein the compliant foil hydrodynamic fluid film journal bearing includes a cartridge having a plurality of axially extending peripheral slots and a plurality of radially extending end slots to promote cooling by the bleed air from the bearing rotor thrust disk.

22. The hydrostatic augmentation system of claim 20 wherein the compliant foil hydrodynamic fluid film journal bearing includes a cartridge having at least one generally arcuate axially extending cooling air cavity communicating with the interior of said cartridge.

23. The hydrostatic augmentation system of claim 22 wherein said cartridge includes at least three interior converging ramps and wherein said at least one generally arcuate axially extending cooling air cavity communicates with the interior of said cartridge by a slot from near the base of one of said at least three converging ramps in the interior of said cartridge.

24. The hydrostatic augmentation system of claim 20 wherein the compliant foil hydrodynamic fluid film journal bearing includes a cartridge having a plurality of axially extending peripheral slots, a plurality of radially extending end slots, and a plurality of axially extending cooling air cavities communicating with the interior of said cartridge to promote cooling by the bleed air from the bearing rotor thrust disk.

25. The hydrostatic augmentation system of claim 20 wherein said bearing rotor includes a cooling air passage extending from the base of the turbine side bearing rotor thrust disk to the interior of said bearing rotor and a cooling air vent from the turbine end of the interior of said bearing rotor to the heat shield, to the back plane of the turbine wheel through the turbine exducer into the turbine exhaust stream to atmosphere.

26. The hydrostatic augmentation system of claim 25 wherein the compliant foil hydrodynamic fluid film journal bearing includes a cartridge having a plurality of axially extending peripheral slots and a plurality of radially extending end slots to promote cooling by the bleed air from the bearing rotor thrust disk.

27. The hydrostatic augmentation system of claim 25 wherein the compliant foil hydrodynamic fluid film journal bearing includes a cartridge having at least one generally arcuate axially extending cooling air cavity communicating with the interior of said cartridge.

28. The hydrostatic augmentation system of claim 27 wherein said cartridge includes at least three interior converging ramps and wherein said at least one generally arcuate axially extending cooling air cavity communicates with the interior of said cartridge by a slot from near the base of one of said at least three converging ramps in the interior of said cartridge.

29. The hydrostatic augmentation system of claim 25 wherein the compliant foil hydrodynamic fluid film journal bearing includes a cartridge having a plurality of axially extending peripheral slots, a plurality of radially extending end slots, and a plurality of axially extending cooling air cavities communicating with the interior of said cartridge to promote cooling by the bleed air from the bearing rotor thrust disk.

30. A hydrostatic augmentation system for a bilateral compliant foil hydrodynamic fluid film thrust bearing used in a turbomachine having a compressor and a turbine on a common bearing rotor rotatably supported by a compliant foil hydrodynamic fluid film journal bearing and a bilateral compliant foil hydrodynamic fluid film thrust bearing with said augmentation system acting upon a bearing rotor thrust disk, said bilateral compliant foil hydrodynamic fluid film thrust bearing having a fluid foil member and a spring foil member, said system comprising:

a thrust plate on the compressor side of said bilateral compliant foil hydrodynamic fluid film thrust bearing including a plurality of connected radially and axially extending orifices in said thrust plate and a plurality of connected circumferential and arcuate open channels on the thrust disk side of said thrust plate to deliver bleed air from said compressor to the compressor side of said bilateral compliant foil hydrodynamic fluid film thrust bearing; and orifice means in said fluid foil member on the compressor side of said bilateral compliant foil hydrodynamic fluid film thrust bearing to deliver bleed air against the bearing rotor thrust disk to establish a pressure differential across said bearing rotor thrust disk as a function of the axial position of said bearing rotor thrust disk with respect to said fluid foil member and said thrust plate.

31. The hydrostatic augmentation system of claim 30 wherein said fluid foil member of said compressor side bilateral compliant foil hydrodynamic fluid film thrust bearing includes a plurality of fluid foil pads each having a hydrodynamic converging ramp, and said orifice means includes a plurality of openings at the base of each hydrodynamic converging ramp.

32. The hydrostatic augmentation system of claim 31 and in addition means to deliver bleed air from said bearing rotor thrust disk to the compliant foil hydrodynamic fluid film journal bearing to cool the compliant foil hydrodynamic fluid film journal bearing.

33. The hydrostatic augmentation system of claim 32 wherein the compliant foil hydrodynamic fluid film journal bearing includes a cartridge having a plurality of peripheral and radial slots to promote cooling by the bleed air from the bearing rotor thrust disk.

34. The hydrostatic augmentation system of claim 32 wherein the compliant foil hydrodynamic fluid film journal bearing includes a cartridge having at least one generally arcuate axially extending cooling air cavity communicating with the interior of said cartridge.

35. The hydrostatic augmentation system of claim 34 wherein said cartridge includes at least three interior converging ramps and wherein said at least one generally arcuate axially extending cooling air cavity communicates with the interior of said cartridge by a slot from near the base of one of said at least three converging ramps in the interior of said cartridge.

36. The hydrostatic augmentation system of claim 32 wherein the compliant foil hydrodynamic fluid film journal bearing includes a cartridge having a plurality of interior converging ramps, a bore liner and a plurality of generally arcuate axially extending cooling air cavities, each of said plurality of arcuate axially extending cavities communicating with the interior of said cartridge.

37. The hydrostatic augmentation system of claim 30 wherein the compliant foil hydrodynamic fluid film journal bearing includes a cartridge having a plurality of axially extending peripheral slots, a plurality of radially extending end slots, and a plurality of axially extending cooling air cavities communicating with the interior of said cartridge to promote cooling by the bleed air from the bearing rotor thrust disk.

38. The hydrostatic augmentation system of claim 30 wherein said bearing rotor includes a cooling air passage extending from the base of the turbine side bearing rotor thrust disk to the interior of said bearing rotor and a cooling air vent from the turbine end of the interior of said bearing rotor to the heat shield, to the back plane of the turbine wheel through the turbine exducer into the turbine exhaust stream to atmosphere.

39. The hydrostatic augmentation system of claim 38 wherein the compliant foil hydrodynamic fluid film journal bearing includes a cartridge having a plurality of axially extending peripheral slots and a plurality of radially extending end slots to promote cooling by the bleed air from the bearing rotor thrust disk.

40. The hydrostatic augmentation system of claim 38 wherein the compliant foil hydrodynamic fluid film journal bearing includes a cartridge having two generally arcuate axially extending cooling air cavities communicating with the interior of said cartridge.

41. The hydrostatic augmentation system of claim 40 wherein said cartridge includes three interior converging ramps and wherein each of said two generally arcuate axially extending cooling air cavities communicate with the interior of said cartridge by a slot from near the base of one of said three converging ramps in the interior of said cartridge.

42. The hydrostatic augmentation system of claim 38 wherein the compliant foil hydrodynamic fluid film journal bearing includes a cartridge having a plurality of axially extending peripheral slots and a plurality of radially extending end slots and a plurality of axially extending cooling air cavities communicating with the interior of said cartridge to promote cooling by the bleed air from the bearing rotor thrust disk.

43. A turbomachine, comprising:
   a compressor and a turbine on a common bearing rotor rotatably supported by a compliant foil hydrodynamic fluid film journal bearing and a bilateral compliant foil hydrodynamic fluid film thrust bearing acting upon a bearing rotor thrust disk, said bilateral compliant foil hydrodynamic fluid film thrust bearing having a fluid foil member and a spring foil member on each side of said bearing rotor thrust disk;
   a thrust plate supporting the bilateral compliant foil hydrodynamic fluid film thrust bearing on the compressor side of said bearing rotor thrust disk;
   channels and fixed orifices in said thrust plate to deliver bleed air from said compressor to the compressor side of said bilateral compliant foil hydrodynamic fluid film thrust bearing;
   fixed orifice means in said fluid foil member on the compressor side of said bilateral compliant foil hydrodynamic fluid film thrust bearing to deliver bleed air against the bearing rotor thrust disk to generate hydrostatic bearing forces on the compressor side of said bearing rotor thrust disk and to generate hydrostatic spring forces on the compressor side fluid foil member;
   fixed orifice means around and/or through said journal bearing cartridge and/or through said journal bearing rotor; and
   variable orifice means within said complaint foil hydrodynamic fluid film thrust bearing that are controlled in conductance as a function of the axial position of said bearing rotor thrust disk;
   said variable orifice means, owing to the variable axial air gaps between said compressor side fluid foil member and said bearing rotor thrust disk and between said fluid foil member and the thrust surfaces of said non-rotating thrust plate at both the outer diameter and the bore of said fluid foil member, cooperating with said fixed orifice means to control the generated hydrostatic bearing forces and the generated hydrostatic air spring forces.

44. The turbomachine of claim 43 wherein the channels in said thrust plate include a plurality of connected radially and axially extending orifices in said thrust plate and a plurality of connected circumferential and arcuate channels on the thrust disk side of said thrust plate.

45. The turbomachine of claim 43 wherein said fluid foil member of said compressor side bilateral compliant foil hydrodynamic fluid film thrust bearing includes a plurality of fluid foil pads each having a hydrodynamic converging ramp, and said orifice means includes a plurality of openings at the base of each hydrodynamic converging ramp.

46. The turbomachine of claim 43 wherein the bearing elements of said compliant foil hydrodynamic fluid film thrust bearing valve the flow of hydrostatic bleed air.

47. The turbomachine of claim 43 wherein the bearing elements of said compliant foil hydrodynamic fluid film thrust bearing function as variable orifices.

48. The turbomachine of claim 43 wherein said variable and fixed orifice means function to control the hydrostatic force on said bearing rotor thrust disk.

49. The turbomachine of claim 43 wherein said variable and fixed orifice means function to control the air spring force on said fluid foil member.

50. A turbomachine, comprising:
   a compressor and a turbine on a common bearing rotor rotatably supported by a compliant foil hydrodynamic fluid film journal bearing and a bilateral compliant foil hydrodynamic fluid film thrust bearing acting upon a bearing rotor thrust disk, said bilateral compliant foil hydrodynamic fluid film thrust bearing having a fluid foil member and a spring foil member on each side of said bearing rotor thrust disk;
   a thrust plate supporting the bilateral compliant foil hydrodynamic fluid film thrust bearing on the compressor side of said bearing rotor thrust disk;
   channels and fixed orifice means in said thrust plate to deliver bleed air from said compressor to the compressor side of said bilateral compliant foil hydrodynamic fluid film thrust bearing;
   fixed orifice means in said fluid foil member on the compressor side of said bilateral compliant foil hydrodynamic fluid film thrust bearing to deliver bleed air against the bearing rotor thrust disk to generate hydrostatic bearing forces on the compressor side of said bearing rotor thrust disk and to generate hydrostatic spring forces on said compressor side fluid foil member;
   variable orifice means within said compliant foil hydrodynamic fluid film thrust bearing that vary in their conductance as a function of the axial position of said bearing rotor thrust disk;
   means to deliver bleed air from said bearing rotor thrust disk to the compliant foil hydrodynamic fluid film journal bearing to cool the compliant foil hydrodynamic fluid film journal bearing; and
   fixed orifice means in said journal bearing to cooperate with said fixed orifice means in said thrust plate and with said fixed orifice means in said fluid foil member and with said variable orifice means in said compliant foil hydrodynamic fluid film thrust bearing to control the generated hydrostatic bearing forces and the hydrostatic spring forces.

51. A turbomachine, comprising:
   a compressor and a turbine on a common bearing rotor rotatably supported by a compliant foil hydrodynamic fluid film journal bearing and a bilateral compliant foil hydrodynamic fluid film thrust bearing acting upon a bearing rotor thrust disk, said bilateral compliant foil hydrodynamic fluid film thrust bearing having a fluid foil member and a spring foil member on each side of said bearing rotor thrust disk;
   a thrust plate supporting the bilateral compliant foil hydrodynamic fluid film thrust bearing on the compressor side of said bearing rotor thrust disk;
   channels and fixed orifice means in said thrust plate to deliver bleed air from said compressor to the compressor side of said bilateral compliant foil hydrodynamic fluid film thrust bearing;

fixed orifice means in said fluid foil member on the compressor side of said bilateral compliant foil hydrodynamic fluid film thrust bearing to deliver bleed air against the bearing rotor thrust disk to generate hydrostatic bearing forces on the compressor side of said bearing rotor thrust disk and to generate hydrostatic spring forces on said compressor side fluid foil member;

variable orifice means within said compliant foil hydrodynamic fluid film thrust bearing that vary in their conductance as a function of the axial position of said bearing rotor thrust disk;

means to deliver bleed air from said bearing rotor thrust disk to the compliant foil hydrodynamic fluid film journal bearing to cool the compliant foil hydrodynamic fluid film journal bearing; and fixed orifice means in said bearing rotor and said journal bearing to cooperate with said fixed orifice means in said thrust plate and with said fixed orifice means in said fluid foil member and with said variable orifice means in said compliant foil hydrodynamic fluid film thrust bearing to control the generated hydrostatic bearing forces and the hydrostatic spring forces.

52. A method of hydrostatically augmenting a bilateral compliant foil hydrodynamic fluid film thrust bearing on a turbomachine having a compressor and a turbine on a common shaft rotatably supported by a compliant foil hydrodynamic fluid film journal bearing on a bearing rotor and a bilateral compliant foil hydrodynamic fluid film thrust bearing on a bearing rotor thrust disk, comprising the steps of:

delivering bleed air from said compressor to the compressor side of said bilateral compliant foil hydrodynamic fluid film thrust bearing having a fluid foil member and a spring foil member; and augmenting the thrust force applied to the compressor side of said bearing rotor thrust disk with bleed air through flow control orifices in said compressor side of said bilateral compliant foil hydrodynamic fluid film thrust bearing.

53. A method of hydrostatically augmenting a bilateral compliant foil hydrodynamic fluid film thrust bearing on a turbomachine having a compressor and a turbine on a common shaft rotatably supported by a compliant foil hydrodynamic fluid film journal bearing on a bearing rotor and a bilateral compliant foil hydrodynamic fluid film thrust bearing on a bearing rotor thrust disk, comprising the steps of:

establishing a pressure differential across the bearing rotor thrust disk by delivering a controlled bleed air flow from said compressor to the compressor side of said bilateral compliant foil hydrodynamic fluid film thrust bearing; and delivering the bleed air from the bearing rotor thrust disk to said compliant foil hydrodynamic fluid film journal bearing to cool said compliant foil hydrodynamic fluid film journal bearing.

* * * * *

UNITED STATES PATENT AND TRADEMARK OFFICE
CERTIFICATE OF CORRECTION

PATENT NO : 5,827,040
DATED : October 27, 1998
INVENTOR(S) : Robert W. Bosley et al.

It is certified that error appears in the above-identified patent and that said Letters Patent is hereby corrected as shown below:

Column 1, line 46, change "nonrotating" to --non-rotating--
Column 7, line 22, change "and around the bearing r" to --thrust disk axial motion"
Column 8, line 27, change "EDM" to --electrical discharge machining (EDM)--

Claim 25, line 7, delete "exducer"
Claim 38, line 7, delete "exducer"

Signed and Sealed this

Ninth Day of February, 1999

Attest:

Attesting Officer

*Acting Commissioner of Patents and Trademarks*

UNITED STATES PATENT AND TRADEMARK OFFICE
CERTIFICATE OF CORRECTION

PATENT NO : 5,827,040
DATED : October 27, 1998
INVENTOR(S) : Robert W. Bosley et al.

It is certified that error appears in the above-identified patent and that said Letters Patent are hereby corrected as shown below:

Column 1, line 46, change "nonrotating" to --non-rotating--
Column 7, line 22, change "and around the bearing r" to --thrust disk axial motion"
Column 8, line 27, change "EDM" to --electrical discharge machining (EDM)--

Claim 25, line 7, delete "exducer"
Claim 38, line 7, delete "exducer"

Signed and Sealed this

First Day of May, 2001

Attest:

NICHOLAS P. GODICI

Attesting Officer     Acting Director of the United States Patent and Trademark Office